Figure 1:
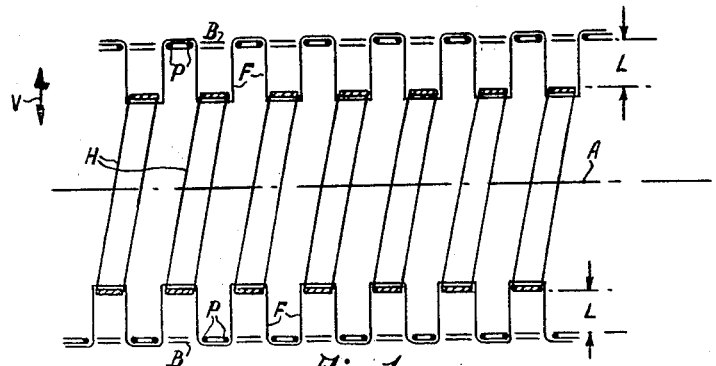

Feb. 24, 1953

D. O. SPROULE 2,629,770

VIBRATION TRANSMITTING SYSTEM

Filed Dec. 18, 1948

2 SHEETS—SHEET 1

Donald Orr Sproule
INVENTOR

By Richardson and
his ATTYS.

Feb. 24, 1953 D. O. SPROULE 2,629,770
VIBRATION TRANSMITTING SYSTEM
Filed Dec. 18, 1948 2 SHEETS—SHEET 2
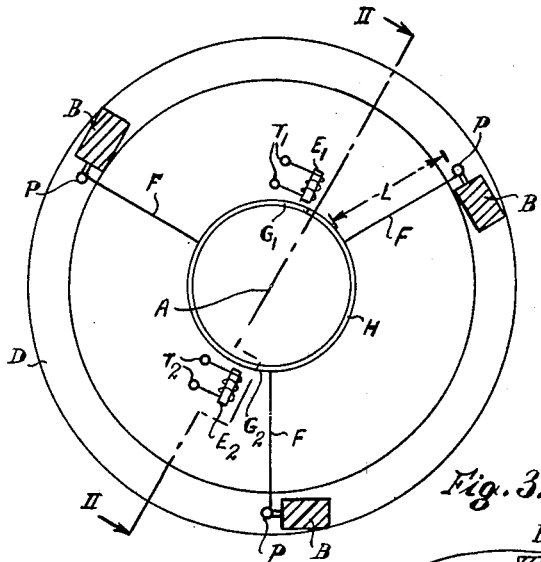
Fig. 3.
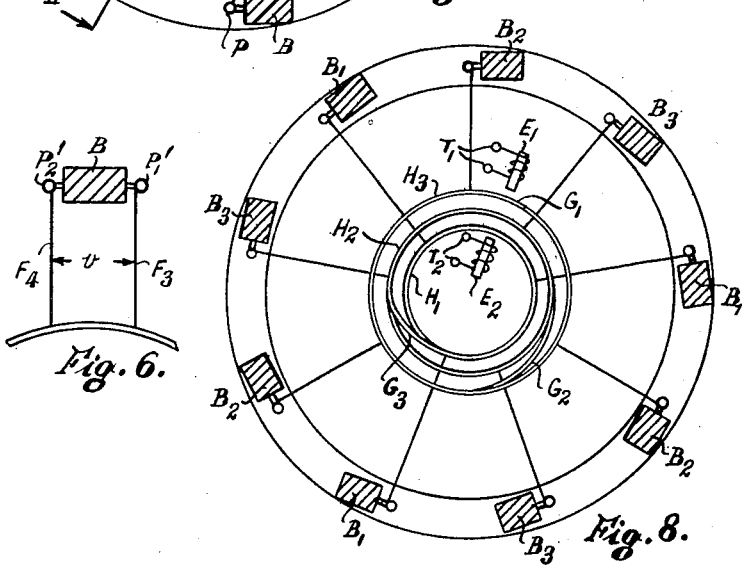
Fig. 6.
Fig. 8.
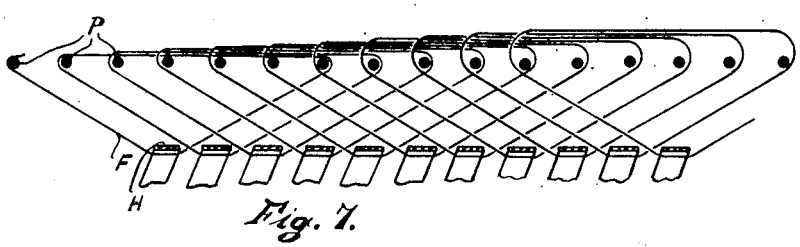
Fig. 7.
Donald Orr Sproule
INVENTOR
By Richardson and David
his ATT'YS.

Patented Feb. 24, 1953

2,629,770

UNITED STATES PATENT OFFICE 2,629,770

VIBRATION TRANSMITTING SYSTEM

Donald Orr Sproule, London, England, assignor, by mesne assignments, to Kelvin & Hughes Limited, Glasgow, Scotland, a company of Great Britain Application December 18, 1948, Serial No. 66,120
In Great Britain December 24, 1947

8 Claims. (Cl. 178—44)

The present invention relates to vibration transmitting systems in which vibrations are transmitted along an elongated body, such vibrations being in a direction transverse with respect to the length of the body.

One example of such a system is described in the specification of British Patent No. 604,429. Thus, as explained in that specification, if a slurred wave train, that is to say a wave train whose frequency varies progressively, is applied to one end of an elongated wave-transmitting body to produce transverse vibration of this end and if the length of the body and the material of which it is composed are suitably proportioned, it can be arranged that the peaks of the wave train arrive at the opposite end of the body substantially simultaneously owing to the fact that the velocity of wave transmission along the body varies with the frequency. In this way it is possible to produce pulses of amplitude which is much larger than that of the exciting wave train.

Arrangements of this kind have many applications such for example as to radar and echo-sounding, some of which applications are referred to in the previously-mentioned British patent specification.

In one example given in the previously-mentioned British patent specification, the elongated body is of brass about twelve hundred centimetres long, 0.1 centimetre wide and 0.01 centimetre thick and is coiled into a spiral of five regularly-spaced turns the mean radius of which is about 38.1 centimetres. An electro-acoustic transducer may be used to apply to one end of the body a wave train having a duration of 0.05 second and a frequency increasing from 4000 cycles per second at the beginning to 2000 cycles per second at the end of the train, there can be obtained from an electro-acoustic transducer at the opposite end of the body a pulse or wave train of duration only about 0.0005 second and of much greater amplitude than the exciting wave train since substantially all the energy of the wave train is in effect compressed into a much shorter time.

The requirements which the present invention is concerned to meet are that the supporting means for the elongated body should be sufficiently robust mechanically for use under practical conditions and yet will not damp the vibrations which are being transmitted from one end of the elongated body to the other to an undue extent.

According to the present invention a vibration transmitting system comprises an elongated body along which transverse vibrations are to be transmitted and a supporting system for the body, the supporting system comprising a supporting frame structure and filamentary supports extending between the body and the frame structure at spaced points along the length of the body for suspending the body from the structure, the filamentary supports being inclined at acute angles with respect to the direction of the said transverse vibrations and lying in support planes inclined, preferably at right angles, to the longitudinal axis of the body and some of the filamentary supports extending to one and some to the opposite side of a reference plane containing the said longitudinal axis and the direction of vibration in order to provide stability in directions perpendicular to this plane. Conveniently the filamentary supports are arranged in pairs, the supports of each pair extending from the same region of the elongated body upon opposite sides of the said reference plane. The filamentary supports should be of a material having a high ratio of strength to weight. A suitable material is nylon.

In some applications of the invention, for instance in its application to the device set forth in the patent specification already referred to, the elongated body is of great length and in order that the device may be as compact as possible the body is conveniently formed into the shape of a helix. Although the present invention will be described with particular reference to an elongated body arranged in the form of a helix, it is to be understood that it is not limited to this form of body, but may be applied to elongated bodies arranged in many other forms.

In the following description it will also be assumed that the elongated body to be supported is a flat strip of steel or other suitable metal coiled into the form of a helix.

It will further be assumed that the vibrations of the strip are in a direction perpendicular to the major surfaces of the strip.

It is evident that since it is desirable that reflection of transverse vibrations at the points of support should be negligibly small, it is necessary that the energy taken up by each support for each vibration passing such support shall be very small in comparison with the energy passing the support. The energy taken up by a support may be due to the motion of the added mass at the point of support or to the tension or stiffness of the material of the support or it may be due to a combination of these.

Referring to Figure 1 of the accompanying drawing, there is represented somewhat diagrammatically a view in cross-section of the helix H having its axis at A. Means, not shown in the figure are provided for setting one end of the helix in vibration in the direction of the arrows V. The supporting structure is represented by two rows of pegs P fixed rigidly to some suitable frame indicated at B. It is to be understood that although two rows of pegs are shown, in practice three rows would usually be provided, these being arranged in planes through the axis of the helix making equal angles with one another. In Figure 1, the turns of the helix are shown supported by nylon threads F which are passed around the pegs P and the turns of the helix H. The distance of the turns of the helix from the supporting pegs is indicated by L and in this example the lengths of the filaments are also equal to L.

The arrangement of Figure 1 suffers from two disadvantages. Firstly, the turns of the helix are not located axially and any slight irregularity in the material may result in two adjacent turns of the helix touching one another and thus impairing the performance of the strip. Secondly, as will be more fully explained later, for a given type and cross-sectional size of filament and for a given value of L, the force exerted upon the turns of the helix for a given displacement in a radial direction, and therefore the energy stored as potential energy in the supporting filaments, will be a maximum when the supporting filaments are arranged in the manner shown in Figure 1.

Figure 2:
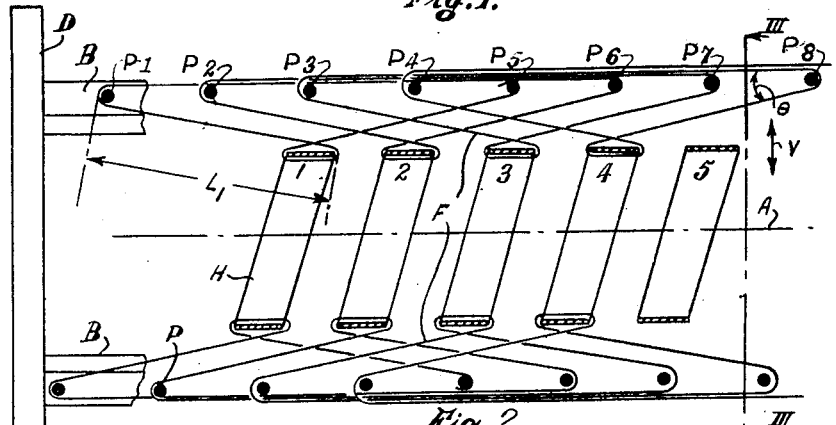
Figure 4:
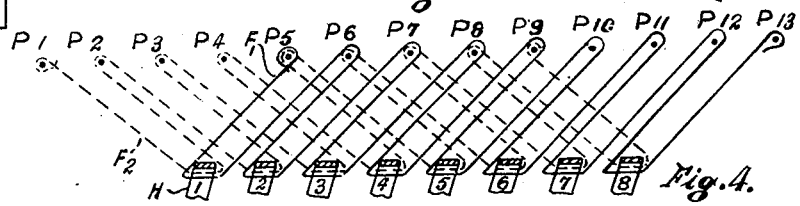
Figure 5:
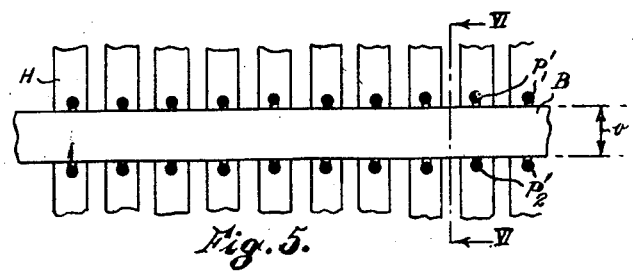

The present invention will be described in more detail with reference to Figures 2-8 of the accompanying somewhat diagrammatic drawings in which Figure 2 is a view in axial cross-section on the line II—II of Figure 3 of a part of a structure in accordance with the present invention in which the elongated body is in helical form. Figure 3 is a view in cross-section on the line III—III of Figure 2, Figures 4 and 7 illustrate, in axial cross-sectional views, other ways of supporting a helix in accordance with the invention, these figures showing only one half of the helix and one row of supports, Figure 5 is a view in plan of a part of an arrangement in accordance with the invention illustrating a feature thereof, Figure 6 is a view in cross-section on the line VI—VI of Figure 5, and Figure 8 is a view similar to that of Figure 3 showing an arrangement for supporting three co-axial helices.

Referring to Figures 2 and 3, it will be seen that the supporting filaments F are arranged in pairs, two of the filaments extending from the same region of a turn of the helix on opposite sides of a plane perpendicular to the axis A of the helix and containing the direction of vibration indicated by the arrows V in Figure 2. The plane referred to also substantially contains the longitudinal axis of the strip in a turn of the helix. The filaments are supported by pegs P fixed to longitudinal frame members N having their ends fixed to annular frame members D. One extremity $G_1$ of the helix is, as shown in Figure 3, set in vibration by an electro-magnetic transducer $E_1$, electric oscillations being applied to terminals $T_1$ of this transducer. These oscillations may, for example, as described in the prior British Specification No. 604,429 already referred to, be in the form of trains of oscillation the frequency of which progressively increases. The length and other dimensions of the helically wound strip, its material, and the wave-form of the trains being such that at the end $G_2$ of the helix remote from $G_1$ the higher frequency oscillations have overtaken the lower frequency oscillations, owing to their higher velocity, with the result that the duration of the train at $G_2$ is much shorter than that of the train at $G_1$ and the amplitude of the former train is much greater than that of the latter. The train at $G_2$ is picked up and converted into electrical oscillations by a transducer $E_2$ having output terminals $T_2$. It will be understood that in Figure 3 the end $G_2$ is not visible since it and the transducer $E_2$ lie in a different plane (parallel to the paper from the end $G_1$ and transducer $E_1$).

The weaving of the nylon thread in the arrangement of Figures 2 and 3 may be carried out as follows. One end of the thread is attached to peg $P_5$, the thread is carried around turn 1 (the left-hand turn) of the helix, around peg $P_1$, around peg $P_6$, turn 2, peg $P_2$, peg $P_7$, turn 3, peg $P_3$, and so on.

The advantages of the arrangement according to the invention, shown in Figures 2 and 3, over that of Figure 1, will now be explained. The compliance $c$ of the supporting filament or thread F is defined by the relation $c=s/f$, where $s$ is the elongation of the filament produced by a force $f$. From the well-known formula for the extension of a fibre of length $L_1$, radius $r$ and Young's modulus $M$, there is obtained the relation $s/f=L_1/\pi r^2 M$ and thus $c=L_1/\pi r^2 M$. From the latter equation, it is seen that the compliance is proportional to $L_1$. The energy W stored in an elastic fibre is given by the equation $W=s^2/2c$.

Applying these equations to the example shown in Figure 1 and Figures 2 and 3 it will be assumed that in each case the distance of the turns of the helix from the pegs is equal to L and that the displacement of the turns of the helix in a direction V perpendicular to the axis of the helix owing to vibration of the turn is equal to S. In the case of Figure 1, the displacement S is in the direction of the filament so that the energy stored in the filament due to such displacement is equal to $s^2/2c$. In the case of Figures 2 and 3, however, the length of the filament is given by $L_1=L/\sin \theta$, where $\theta$ is the angle between the filament and the axis of the helix. The displacement S of the strip is not in this case in the direction of the filament and the component $s$ of the displacement in the direction of the filament for a displacement S of the strip in a direction radially with respect to the axis is equal to $S \sin \theta$. Substituting these values in the equation for the energy W which is stored in the filament, it will be seen that the energy $W_2$ in the case of Figures 2 and 3 is given by $W_2=s^2 \sin^3 \theta \pi r^2 M/2L$. The corresponding energy $W_1$ which is stored in the case of Figure 1 is given $W_1=s^2\pi r^2 M/2L$.

From this it will be seen that for a given displacement in the direction V of vibration of the strip, the energy stored in the arrangement according to the invention shown in Figures 2 and 3, as compared with the energy stored in the arrangement of Figure 1, is decreased by the factor $\sin^3 \theta$. Thus by making $\theta$ small, this factor can be made very small. When $\theta$ has the value 30°, the energy stored in the support in the arrangement of Figure 2 is only ⅛ of that in the arrangement of Figure 1. Where $\theta = 12\frac{1}{2}°$, the ratio of the energy stored in the arrangement of Figures 2 and 3 compared with that in the Figure 1 arrangement is approximately ¹⁄₁₀₀.

Figure 4 shows an alternative arrangement of the supporting filament and illustrates the way in which the filament may be woven. In this case two threads, for example of nylon, are used, one of these F₁ being shown in full lines and the other F₂ in dotted lines. In order to weave the thread shown in dotted lines, one end is tied to the peg 1, and a bobbin carrying the thread is passed through the helix from left to right and held in such a way that the thread lies along the inside of the turn of the helix. A hook, such as a crochet hook, may then be used in order to draw out loops of the thread between pairs of turns of the helix. Thus a loop is drawn between turns 1 and 2 of the helix and passed over peg P2. A loop is then drawn between turns 2 and 3 of the helix and passed over peg P3, and so on. Assuming that the helix has only eight turns, after the loop between the turns 7 and P8 of the helix has been looped around the peg 8, the end of the thread is fixed to peg P9. The full line thread is fixed at one end to peg P5, and the bobbin is threaded as before through the helix from left to right and loops are drawn around the pegs P6, P7, etc., the end of the thread being fastened to the peg P13.

It has already been mentioned that the effect of the supporting thread is to enlarge the diameter of the helix. The radial force exerted upon the thread and the reaction of the thread accurately locates the turns of the helix in relation to the pegs.

In order to facilitate the weaving operation, the strip forming the helix may be wound on a framework of bars arranged parallel to the axis of the helix, some or all of these bars being grooved to give axial location to the turn. These bars are capable of making each turn conform approximately to a cylindrical surface. After the weaving operation, the supporting bars are removed.

The threads shown in dotted and full lines in Figure 4 are preferably arranged to lie in one plane and, as already stated, preferably three such sets of supporting filaments are provided, the planes thereof being spaced apart by about 120° as in the arrangement shown in Figure 3. In some cases, particularly where the strip material of which the helix is composed is very thin, supports may be provided in more than three planes, these being preferably symmetrically disposed around the axis of the helix.

In some cases it may be necessary to use a relatively strong supporting fibre and it may then be found that appreciable reflections occur at the points of support. Such reflections decrease the usefulness of the system and may be overcome or reduced by the use of the phenomenon of "destructive interference." The way in which this can be done will be described with reference to Figures 5 and 6. In these figures there is shown a supporting bar B corresponding to the bars of like reference in Figures 2 and 3. In Figures 5 and 6, however, instead of one row of pegs at each supporting plane, there are provided two rows of pegs P₁' and P₂', one upon either side of the bar B. In each supporting region, there are used two sets of supporting threads, one F₃ associated with the pegs P₁' and the other F₄ with the pegs P₂'. The distance $v$ between the points at which the threads F₃ and F₄ are fixed to the pegs and the distance apart of the points at which the threads of the two sets engage the turns of the helix are arranged to be substantially equal to ¼ of the wave length or mean wave length of the vibration to be transmitted. Each of the sets of supporting threads may be as shown in Figure 4 or, if the wave length of the oscillation to be transmitted along the strip is not very large, one supporting thread, say the full line thread in Figure 4, may be provided around one of the sets of pegs P₁' and the other, say the dotted thread, may be provided around the other set of pegs P₂'. Owing to the spacing of the supporting threads, the reflection from a wave travelling along the strip produced at the first point of support encountered will be substantially cancelled, or at least reduced in amplitude, by the echo from the second point of support since the second reflection will lag behind the first reflection by approximately 180° in phase.

The way in which the weaving may be carried out in order to produce the arrangement shown in Figures 5 and 6 will be understood from the description which has been given of the weaving in the case of Figures 2 and 4.

Although the arrangement of Figures 2 and 3 is simpler than that of Figure 4, since only two threads are used to support each turn in each region of support instead of four threads in the arrangement of Figure 4, it will be noted that the strip is not located axially, and in order to provide such location, in the arrangement of Figures 2 and 3 adhesive is applied between the thread and the turn of the helix to prevent relative movement.

A further method of arranging the supporting threads in accordance with the present invention is shown in Figure 7. In this arrangement also only two threads are provided to support each turn in each region of support. As in the arrangement of Figures 2 and 3, adhesive should be applied between each turn and the thread to prevent sliding movement of the strip over the supporting thread. The way in which the weaving may be carried out in the arrangement of Figure 7 will be understood from the previous description.

In one arrangement constructed in accordance with Figure 4, there has been used a steel strip 131 metres long, 0.012 inch thick and 0.114 inch wide formed into a helix such that each turn contains 1 metre of strip. The supporting threads were of nylon consisting of 15 fibres of 3 deniers each fibre and a twist of 5 turns per inch.

It will be appreciated that it may be convenient to provide a second helix outside the first, the strip forming the second helix being a continuation of that forming the first, and a third helix outside the second helix and so on until the required length of strip has been accommodated.

Assuming that electrical oscillations are used to generate the vibrations applied to one end of the strip and that the vibrations at the other end of the strip are converted into electrical oscillations, it will usually be preferable to provide an odd number of helices since the transducer employed for introducing the vibrations at one end will then be displaced relatively to the transducer employed for picking up the vibrations and transforming them into electrical oscillations. In this way coupling between the two transducers is reduced.

One arrangement embodying three helices $H_1$, $H_2$ and $H_3$ is shown in Figure 8. The end $G_1$ of helix $H_3$ is excited by the transducer $E_1$. The opposite (lower) end of this helix is joined at $G_2$ to the adjacent (lower) end of the helix $H_2$. The other (upper) end of the helix $H_2$ is joined at $G_3$ to the corresponding end of the helix $H_1$ co-operates with the output transducer $E_2$.

The helix $H_1$ is supported by filaments arranged in any of the ways described from longitudinal frame members $B_1$; the helices $H_2$ and $H_3$ are similarly supported from frame members $B_2$ and $B_3$ respectively. The filaments supporting the inner helix $H_1$ are arranged to pass through gaps between the turns of the helices $H_2$ and $H_3$ and the filaments supporting the helix $H_2$ pass through gaps between turns of the helix $H_3$.

In all the arrangements described, instead of using pegs to support the filaments, other equivalent means may be used. For instance suitable deformations may be provided upon the longitudinal frame members B to perform the function of pegs.

If preferred the supporting filaments may run inwardly to frame members within the helix.

The arrangements of the present invention may, as already stated, be employed for suspending vibration-transmitting bodies of shape other than helical, for instance of spiral shape or a shape embodying a plurality of parallel spirals, or even a straight body in cases where the length of the wave-transmitting body is not required to be so great as to render the system inconveniently large.

In the case of a straight body, at each of the regions of support, the threads will lie in a plane which will be inclined with respect to the direction of elongation of the body. In most instances, the planes of the supporting threads will be perpendicular to the direction of elongation, and if the straight body is horizontal, each plane will be vertical.

In the case of a helically elongated body, the direction of elongation is tangent to the helix at any particular point under consideration and is also perpendicular at such point to a radial plane passing through such point and through the axis of the helix.

I claim:

1. A vibration transmitting system comprising an elongated body for transmitting transverse vibrations and a supporting system for said body, said supporting system comprising a supporting frame structure and a plurality of filamentary supports extending between the body and the frame structure at each of a plurality of regions spaced apart along the length of the body for suspending the body from the structure, the filamentary supports at each said region being inclined at acute angles with respect to the direction of the said transverse vibrations and lying in a plane inclined at each of said regions to the direction of elongation of the body and at least one of the filamentary supports extending to one side and at least one of the filamentary supports extending to the opposite side of a further plane containing the said direction of elongation and the direction of vibration at the said region in order to provide stability in directions perpendicular to this last named plane.

2. A system according to claim 1, wherein the first named plane is inclined at substantially each of said regions at right angles to the direction of elongation of said body.

3. A vibration transmitting system comprising an elongated body in the form of a helix for transmitting along the length of the elongated body vibrations in a direction transverse with respect to the helical longitudinal axis of said body, and a supporting system for said body, said supporting system comprising a supporting frame structure and at least three sets of filamentary supports, each set comprising a pair of filamentary supports extending between a region at which such pair engages the helix and the frame structure, the sets being angularly displaced relatively to one another around the axis of the helix, said filamentary supports being inclined at acute angles with respect to the direction of said transverse vibrations and with respect to the axis of said helix, and lying in planes substantially parallel to the axis of said helix and one of said filamentary supports of each said pair extending to one side and the other extending to the opposite side of a plane normal to the axis of said helix and passing through the region at which such pair engages the helix.

4. A vibration transmitting system comprising an elongated body in the form of a helix for transmitting along the length of the elongated body vibrations in a direction transverse with respect to the longitudinal axis of said body, and a supporting system for said body, said supporting system comprising a supporting frame structure and filamentary supports extending between said frame structure and said helix, said filamentary supports being inclined at acute angles to the axis of said helix.

5. A vibration transmitting system comprising an elongated body in the form of a helix for transmitting along the length of the elongated body vibrations in a direction transverse with respect to the longitudinal axis of said body, and a supporting system for said body, said supporting system comprising a supporting frame structure and at least three sets of filamentary supports, the said sets being spaced apart angularly around the axis of said helix and said filamentary supports extending between said frame structure and said helix and being inclined at acute angles to the axis of said helix.

6. A vibration transmitting system comprising an elongated body in the form of a helix for transmitting along the length of the elongated body vibrations of predetermined wavelength in a direction transverse with respect to the longitudinal axis of said body, means for applying transverse vibrations to said body, and a supporting system for said body, said supporting system comprising a supporting frame structure and at least two sets of filamentary supports extending between said frame structure and said helix, the point of attachment of each filamentary support of one set to a turn of the helix being spaced from the point of attachment to the same turn of the helix of a filamentary support of the other set by substantially a quarter of the wavelength of said vibrations.

7. A vibration transmitting system comprising an elongated body for transmitting transverse vibrations and a supporting system for said body, said body being in the form of a plurality of coaxial helices having their ends connected together for the transmission of vibrations in series through said helices, and said supporting system comprising a supporting frame structure and separate filamentary supports connecting each of said helices to said frame structure, each of said filamentary supports being inclined at an acute angle to the axis of the helices.

8. A vibration transmitting system comprising an elongated body for transmitting transverse vibrations and a supporting system for said body, said body being in the form of a plurality of coaxial helices having their ends connected together for the transmission of vibrations in series through said helices, and said supporting system comprising a supporting frame structure and separate filamentary supports connecting each of said helices to said frame structure, each of said filamentary supports lying in a plane containing the axis of the helices and being inclined at an acute angle to this axis.

DONALD ORR SPROULE.

REFERENCES CITED

The following references are of record in the file of this patent:

UNITED STATES PATENTS

| Number | Name | Date |
|---|---|---|
| 1,799,634 | Norton | Apr. 7, 1931 |
| 1,852,795 | Wegal | Apr. 5, 1932 |
| 2,437,445 | Stack | Mar. 9, 1948 |